United States Patent
Pinder et al.

(10) Patent No.: US 8,295,825 B2
(45) Date of Patent: Oct. 23, 2012

(54) METHOD TO FACILITATE LATE JOINING OF A CALL

(75) Inventors: Ellis A. Pinder, Davie, FL (US); Branko L. Avanic, Miami, FL (US); Lorenzo J. Cruger, Coral Springs, FL (US); Tan V. Dinh, Davie, FL (US); Mahes M. Ekanayake, Davie, FL (US); Armando J. Gonzalez, Miami, FL (US); Joseph P. Heck, Ft. Lauderdale, FL (US); Shakeeb Z. Khan, Davie, FL (US); Joseph J. Medvid, III, Weston, FL (US); Wayne M. Phang, Coral Springs, FL (US); Charles R. Ruelke, Margate, FL (US); Dang N. Vu, Parkland, FL (US); Richard S. Young, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 148 days.

(21) Appl. No.: 12/957,190

(22) Filed: Nov. 30, 2010

(65) Prior Publication Data

US 2012/0135725 A1 May 31, 2012

(51) Int. Cl.
*H04W 4/00* (2009.01)
(52) U.S. Cl. .............. 455/422.1; 455/63.1; 370/473
(58) Field of Classification Search ............... 455/422.1, 455/63.1; 370/473
See application file for complete search history.

(56) References Cited

U.S. PATENT DOCUMENTS

| 5,185,796 A * | 2/1993 | Wilson ........................ 380/277 |
| 6,052,407 A | 4/2000 | Ciccone et al. |
| 6,249,582 B1 | 6/2001 | Gilley |
| 6,714,795 B1 | 3/2004 | Long et al. |
| 2007/0041404 A1 | 2/2007 | Palanki et al. |
| 2007/0074036 A1 * | 3/2007 | Ramzan et al. ............. 713/176 |
| 2008/0287146 A1 | 11/2008 | Liu et al. |
| 2008/0310423 A1 * | 12/2008 | Dekel et al. ............. 370/395.53 |
| 2009/0197537 A1 * | 8/2009 | Isaacs ........................ 455/63.1 |
| 2011/0028140 A1 * | 2/2011 | Dewasurendra et al. .. 455/422.1 |
| 2011/0170470 A1 * | 7/2011 | Sinnarajah et al. ........... 370/312 |

OTHER PUBLICATIONS

PCT International Search Report Dated April 27, 2012 for Counterpart Application PCT/US2011/058351.

* cited by examiner

*Primary Examiner* — Barry Taylor
(74) *Attorney, Agent, or Firm* — Anthony P. Curtis; Daniel R. Bestor (57) ABSTRACT

Methods of enabling late entry into an on-going spread spectrum call are described. A late join frame replaces, and has the same size as, a traffic frame. A late join slot in the late join frame contains sufficient information in preamble and sync subframes to permit a target to join the call. The traffic slots in the late join frame replicate data such that call quality of the call is substantially unaffected if one of the remaining traffic frames is not received. The preamble and sync subframes frequencies may be the same as, or different from, preamble and sync frames frequencies during a call establishment phase of the call. If different, the preamble and sync subframes frequencies are selected from one or more frequencies. Use of the preamble and sync subframes frequencies is compensated for when selecting the traffic slot frequencies to obtain uniform utilization of the spectrum.

29 Claims, 8 Drawing Sheets

METHOD TO FACILITATE LATE JOINING OF A CALL

TECHNICAL FIELD

The present invention relates to a communication method and, in particular, to a method of facilitating late joining of a call.

BACKGROUND

Mobile communication systems include portable handheld RF communication devices such as cellular telephones, laptop computers, and data communication devices (PDAs) as well as infrastructure devices such as base stations, controllers and the like. Such systems typically operate according to a set of industry standards or protocols in one or more bands. One example of communication devices whose popularity is continually growing is Push-to-talk (PTT) radios, which previously have been used primarily by emergency personnel. PTT radios generally enable a user to communicate with a group of one or more users (talkgroup) on the same channel.

One popular band used by PTT radios is the 900 MHz Industrial, Scientific and Medical (ISM) band. Frequency-hopping spread spectrum communication is employed in the ISM band to reduce the susceptibility of radios to interference and maximize communication range. However, many countries have regulations regarding spectrum usage. In the United States, for example, the frequency hopping spectral distributions are governed by the Federal Communication Commission (FCC) and must meet distribution requirements that utilize spectrum uniformly across the ISM band.

In general, there are three phases of a call: establishing a connection in a connection establishment phase, transmitting data in a traffic phase, and terminating the connection in a stop phase. Each of these phases involves sending control or data information from the originator to the target and perhaps acknowledging the receipt of the transmission during different frames of a predetermined duration. The traffic phase contains TCH (Traffic CHannel) or simply traffic frames and the stop phase contains a SSW frame.

In the connection establishment phase, the target determines whether a call is present and if so the manner in which to adjust its frequency to receive data during the traffic phase of the call. During this phase, the target receives control information such as synchronization in various frames of information. While the use of spread spectrum techniques provides advantages, these techniques rely on radios receiving the call setup information during the connection establishment phase to enable data to be received during the traffic phase. If a target misses some or all of the call setup information, a target may not be able to join a call that is in progress (also referred to as an on-going call). Instead, the target waits for the current call to end and for the next call to start. Moreover, if the target loses communication with the originator by dropping a sufficient number of consecutive packets, it is unable to re-join the call.

It is thus desirable to provide a means for a target to join a call that is already in progress.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Methods are presented to enable late entry of a communication device into a call, such as a PTT call in which one originator (communication device originating the transmission) transmits to one or more targets (communication devices ultimately receiving the transmission). Each late join frame replaces a traffic frame having a plurality of traffic slots. The late join frame is the same size as the traffic frame and replaces one of the traffic slots with a late join slot. The late join slot contains sufficient information in preamble and sync subframes to permit a target to join the call. A target already in the call ignores the late join frame. The traffic slots in the traffic frames and late join frame replicate data such that call quality of the call is substantially unaffected if one of the traffic slots is not received. In the worst case scenario, the call quality is affected only to the extent of missing a portion of the audio corresponding to the late join frame. In such a case, the call quality is already compromised and thus masks the degradation due to the late join frame (i.e., it is essentially imperceptible to a listener). In all other cases, the call quality is unaffected or affected to the extent of missing speaker intrinsic properties (but still being intelligible) for that portion of audio corresponding to the late join frame. The preamble and sync subframes frequencies may be the same as, or different from, the frequencies on which preamble and sync frames are received during a call establishment phase at the beginning of the call (during which targets normally join the call). If different, the preamble and sync subframes frequencies are selected from one or more predetermined frequencies. A target not in the call thus scans both the preamble and sync frames frequencies and one or more frequencies used by the preamble and sync subframes. The preamble and sync subframes frequencies may be mapped in a one-to-one correspondence to enable a target that detects a preamble on the preamble subframe frequency to first look for a sync burst on the corresponding sync subframe frequency before looking for a sync burst on other sync subframe frequencies. Use of the preamble and sync subframes frequencies is compensated for when selecting the traffic slot frequencies in order to obtain uniform utilization of the spectrum and meet broadcast usage regulations of the spectrum.

Figure 1:
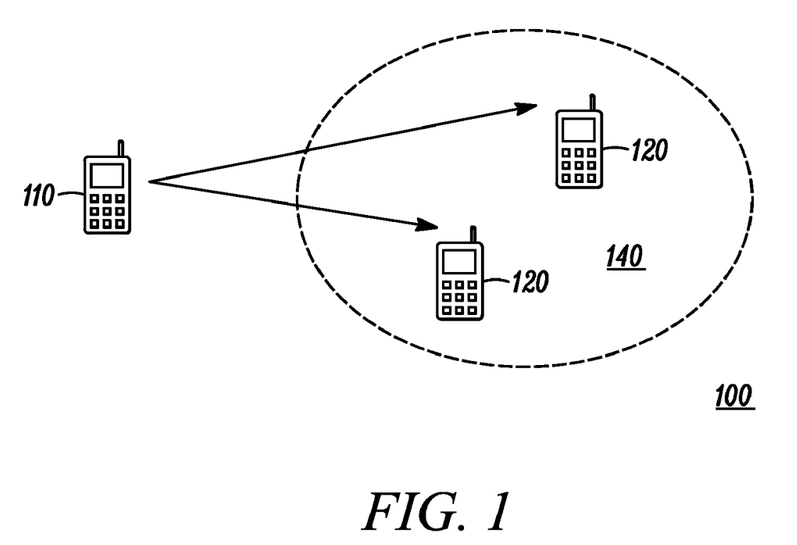
FIG. 1 illustrates an embodiment of a communication system.

FIG. 1 illustrates a general network 100 that includes communication devices 110, 120. The communication device 110, 120 can be, for example, a cellular telephone, personal digital assistant, PTT radio or mobile station used by emergency personnel. The communication devices 110, 120 include an originator (or transmitting radio) 110 and one or more targets (or receiving radio) 120. The targets 120 may form a talkgroup 140 to which transmissions from the originator 120 are directed. A call that is established communicates directly without using an infrastructure, which is called direct mode or direct mode operation.

Figure 2:
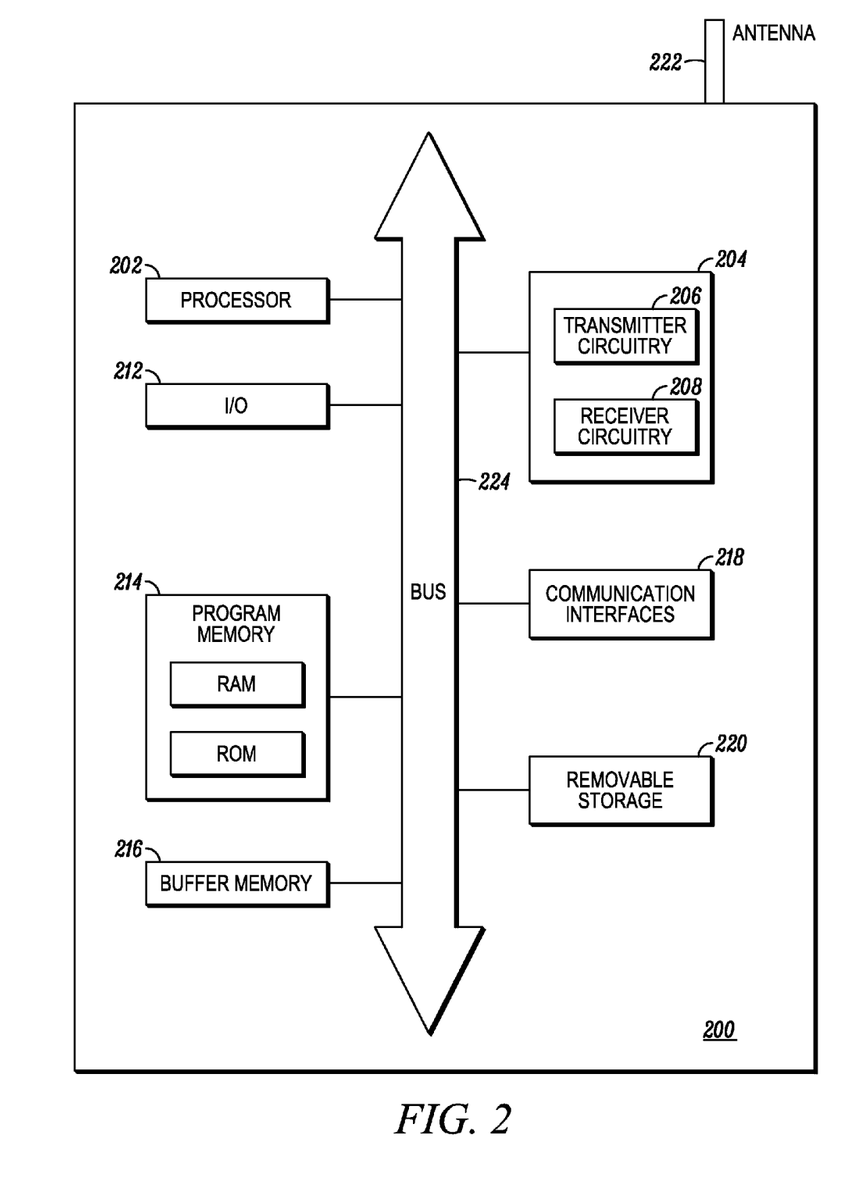
FIG. 2 illustrates an internal block diagram of an embodiment of a communication device.

An embodiment of one of the communication devices 110, 120 is shown in the block diagram of FIG. 2. The communication device 200 may contain, among other components, a processor 202, a transceiver 204 including originator circuitry 206 and target circuitry 208, an antenna 222, I/O devices 212, a program memory 214, a buffer memory 216, one or more communication interfaces 218, and removable storage 220. The communication device 200 is preferably an integrated unit and may contain at least all the elements depicted in FIG. 2 as well as any other element necessary for the communication device 200 to perform its electronic functions. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are stored in the program memory 214 and may include instructions such as estimation and correction of a received signal and encryption/decryption that are executed by the processor 202 as well as information related to the transmit signal such as modulation, transmission frequency or signal amplitude. The program memory 214 may be an IC memory chip containing any form of random access memory (RAM) and/or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the communication device 200 are described in detail below.

The originator circuitry 206 and the target circuitry 208 enable the communication device 200 to respectively transmit and receive communication signals. In this regard, the originator circuitry 206 and the target circuitry 208 include appropriate circuitry to enable wireless transmissions. The implementations of the originator circuitry 206 and the target circuitry 208 depend on the implementation of the communication device 200 and the devices with which it is to communicate. For example, the originator and target circuitry 206, 208 may be implemented as part of the communication device hardware and software architecture in accordance with known techniques. One of ordinary skill in the art will recognize that most, if not all, of the functions of the originator or target circuitry 206, 208 (such as vocoder) may be implemented in a processor, such as the processor 202. However, the processor 202, the originator circuitry 206, and the target circuitry 208 have been artificially partitioned herein to facilitate a better understanding. The buffer memory 216 may be any form of volatile memory, such as RAM, and is used for temporarily storing received or transmit information.

The communication device 200 may also contain a variety of I/O devices such as a keyboard with alpha-numeric keys, a display (e.g., LED, OELD) that displays information about the communication device or communications connected to the communication device, soft and/or hard keys, touch screen, jog wheel, a microphone, and a speaker.

Turning now to specifics about the spread-spectrum protocol, as above during the connection establishment phase, a target receives a signal from the originator in which the target acquires the transmit frequency, bit and frame synchronization, frequency hopping seed, code identity and message content description in sets of preamble and sync frames. After receiving this information, the target sends an acknowledgment to the originator. The connection establishment phase is then completed by reception of the Private ID (PID) of the originator in a message header frame. The PID, hopping seed, and code identity are essentially unique to each call and the associated communication devices participating in the call.

Regarding frequency hopping, each call operates on a set of frequencies (hereinafter referred to as a hop set) within one or more frequency bands (such as the ISM band). A first group of frequencies within a particular hop set are used at the beginning of the connection establishment phase to allow a target to detect the start of the transmission. After this initial detection, in the remaining portions of the connection establishment phase, in addition to the traffic phase and the termination phase, each slot is transmitted on a sequence of frequencies within the hop set as determined by a pseudo-random number (PN) sequence. More specifically, the PN sequence is used to select a frequency index, which is mapped to a particular frequency within the hop set. The originator sends its hop seed and PN code during the connection establishment phase. This allows the target(s) to move from frequency to frequency in concert with the originator. Each individual target initializes its PN code at power-up and maintains the PN sequence across all transmissions.

The PN sequence is essentially designed to result in a near-uniform probability of frequency use in the hop set. The PN sequence uses one or more mapping tables in which the pseudo-random number of the particular slot is mapped to a frequency index across the hop set. The manner in which this is performed differs dependent on the number of slots in the call in order to comply with FCC regulations. A first mapping table that de-emphasizes selection of the first group of frequency indices (those used in some or all of the connection establishment phase) is used if the call uses less than a preset number of slots. This permits the originator to compensate for the use of the first group of frequency indices that occur at the start of every call. After the number of traffic slots in the call exceeds the preset number of traffic slots, all subsequent traffic slots use a different mapping table in which the PN of the particular traffic slot is evenly mapped to the set of frequency indices across the entire hop set. This is due to the fact that the use of the first group of frequency indices at the start of every call has been adequately compensated for. The preset number of traffic slots is thus mathematically defined as the number of traffic slots that are sufficient to equalize selection of the preset frequency indices to account for their use at the start of every call in order to comply with the appropriate jurisdictional regulations (e.g., FCC regulations).

The frequency indices are subsequently mapped to frequency numbers, which are used to calculate the absolute frequency. This is a one-to-one mapping and is independent of the mapping table used to translate the PN of a frame to the frequency index. The frequency index to frequency number mapping ensures maximum frequency diversity of the preamble and sync frames.

Figure 3:
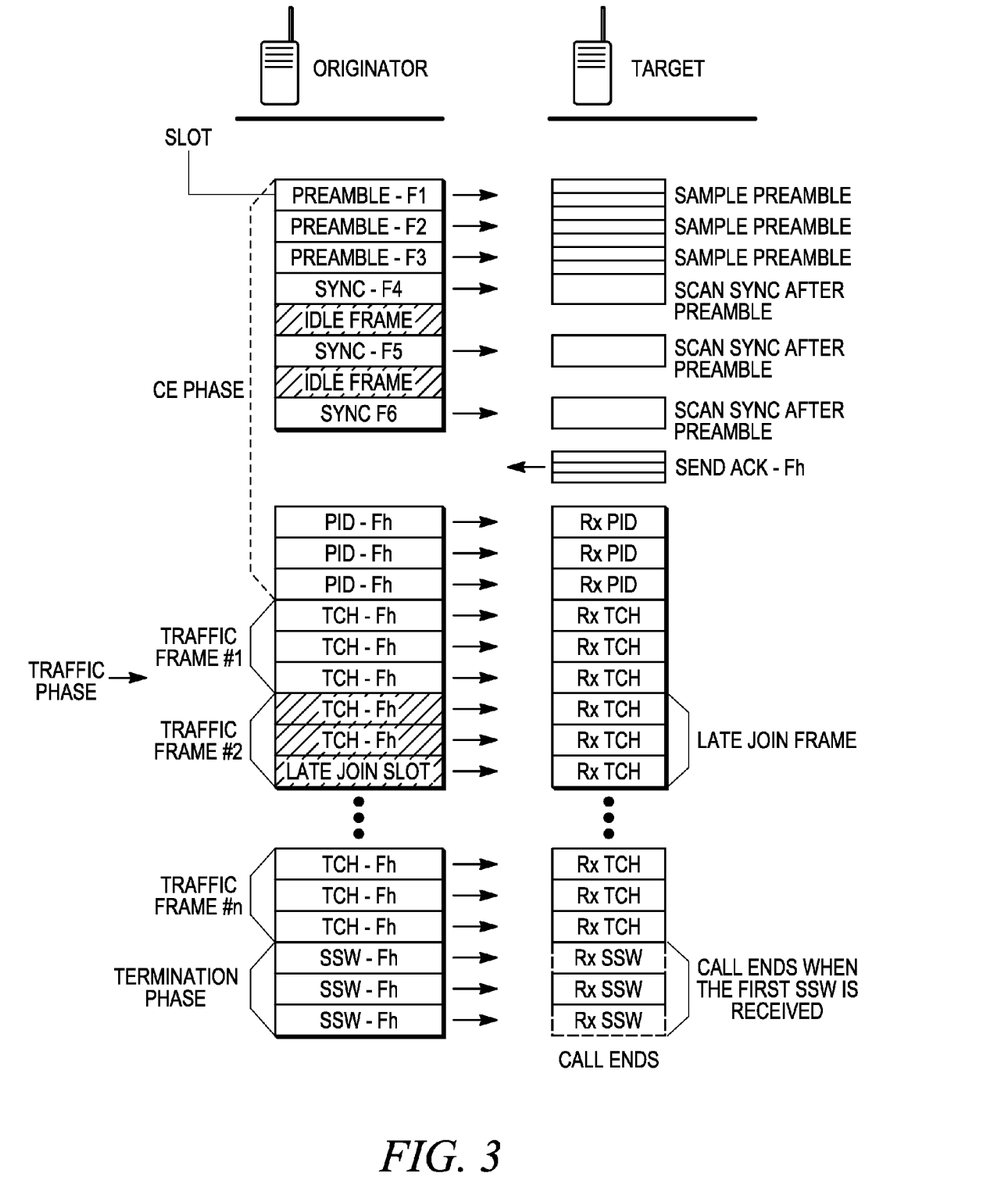
FIG. 3 illustrates an embodiment of communication between an originator and target.

Turning now to FIG. 3, which illustrates the transmissions in a typical call, the call begins with a preamble that is transmitted as a sequence of consecutive preamble frames on predetermined preamble frequencies, e.g., frequencies F1, F2, and F3 as shown in FIG. 3. The preamble frequencies correspond to the frequency indices in the aforementioned first group of frequency indices. A sequence of sync frames follows the preamble sequence and is transmitted on predetermined sync frequencies, e.g., frequencies F4, F5, and F6 as shown in FIG. 3, corresponding to the frequency indices in the aforementioned first group of frequency indices. Each sync sequence contains n (first integer number of) sync frames. Each sync frame contains approximately m (second integer number of) bits, with each sync frame containing the PN seed, message type, target ID, and sync sub-block indicator to indicate which of the sync frames in the sync sequence is being transmitted. The first group of frequency indices thus contains a first set of frequency indices associated with the preamble frames and a second set of frequency indices associated with the sync frames. The target monitors the first set of frequencies of the first group of frequency indices for the preambles, and upon detection, monitors the second set of frequencies of the first group of frequency indices for sync data decode.

Each of the preamble and sync sequence contains multiple bursts of data that are redundant. This maximizes the chance of establishing the call. In other words, in the preamble sequence the same preamble is transmitted at different frequencies in different preamble frames, and in the sync sequence the same sync data is transmitted at different frequencies in different sync frames. As shown in FIG. 3, three frames of redundant data are transmitted in each of the preamble and sync sequences, although in other embodiments other numbers of frames can be used for each sequence. Although both the preamble and sync sequences have the same number of frames, the number of frames in the preamble sequence and the number of frames in the sync sequence may be different. Idle frames may be disposed between consecutive preamble and/or sync frames (as shown in FIG. 3) or adjacent frames may be occupied by preamble or sync data.

As defined herein, predefined frequencies are frequencies from the hopset that are apriori assigned to preamble and sync frames. Unlike the preamble and sync frames, which use pre-defined frequencies, the frames thereafter are transmitted using frequencies in the hop set that are defined by the originator PN seed that was received by the target during the sync sequence. The PN seed is a pseudo random number that enables the selection of a random frequency from the hop set. The PN seed is updated by both the originator and target using the same mechanism so that they hop in sync for the rest of the call. After the preamble and sync sequences are transmitted, the call continues with a handshaking sequence consisting of an acknowledgement sequence followed by a message header sequence. When a target is able to receive and decode at least one sync frame it transmits an acknowledgement sequence of acknowledgement frames and the originator completes the handshake by transmitting a message header sequence consisting of message header frames. Each message header frame may simply contain the ID of the originator and thus the target can decide if it wants to continue receiving the call.

The last message header slot marks the end of the connection establishment phase. The immediately succeeding slots and frames form the traffic phase. The traffic phase is formed from traffic frames that each contains a plurality of traffic slots. Each traffic slot contains a voice (or data) burst. Each traffic slot begins with a transition period that permits the originator/target to determine the new frequency and the local oscillator in the originator/target to lock into the new frequency. This is followed by a sync pulse that is used to facilitate a robust communication link. Data of the voice burst is then digitized and vocoded before being transmitted from the originator to the target over sequential traffic slots. The call terminates using a single stop frame (SSW) containing a plurality of stop slots (as shown 3). When any of the stop slots of the SSW frame is received, the call terminates. As shown in FIG. 3, the second stop slot is received by the target, ending the call.

Although any number of traffic slots may be used to transmit each voice burst in a traffic frame, FIG. 3 illustrates an embodiment in which three traffic slots are used. While the voice data in each traffic slot in the traffic frame is redundant, it is however not identical with the voice data in the other traffic slots in the same traffic frame. In one example, the vocoder output is subdivided into Class I, Class II, and Class III data. Class I data is most important to voice quality, and Class III data is least important to voice quality. Each of the three traffic slots includes the same Class I data, however Class II and Class III data is interleaved such that subsections of this data are sent on exactly two of the three traffic slots. The best voice quality is achieved if two or three traffic slots of the traffic frame are received, as no data is lost. The voice quality degrades slightly if only one traffic slot of the traffic frame is received; however, this voice data remains intelligible because the Class I data is included in all three traffic slots.

As above, this replication of voice data reduces the susceptibility of the communication to interference and increases the communication range. It also enables a means for a target to join an in-progress call. It is clear from the above that there are a number of reasons for a target to miss some or all of a call, e.g., if it misses all of the preamble or sync frames or if it misses a certain number of traffic frames. In the first example if no preamble is received, the target will not look for sync data. As the originator sends the hop seed (which again allows the target to determine the next frequency in the hop sequence) only at the beginning of the call during the sync frames, the target will be unable to hop with the originator if the sync frame is not received. If a predetermined number of consecutive traffic frames are not received, the target will revert to looking for preamble frames to avoid missing the start of the next call.

To enable a target to join in an on-going call, the originator replaces one traffic slot in a traffic frame with a late join slot to thereby form a late join frame. The late join slot contains information sufficient to permit a target to join the call. As used herein, sufficient information is defined as the same information available in a preamble and sync frame, and optionally the information in the message header slot. From the above, the replacement of one traffic slot with the late join slot does not substantially affect the call quality if the other two traffic slots of the late join frame are received, and, if only one of the other traffic slots of the late join frame are received, the call quality, while noticeably affected, still remains sufficient to render the voice information in the packet intelligible.

Figure 4:
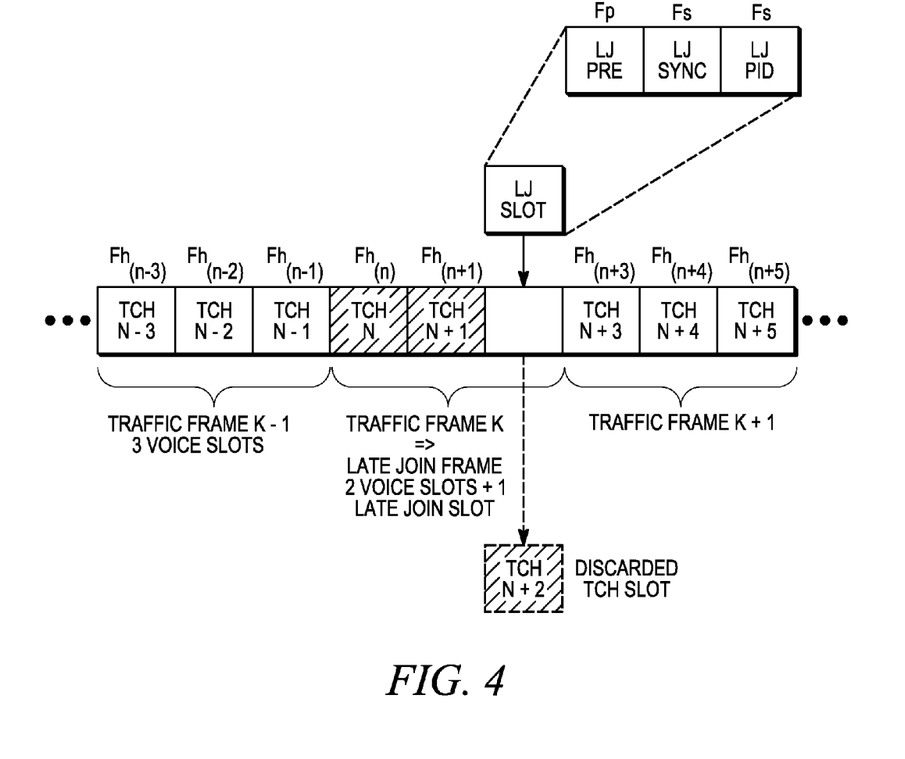
FIG. 4 illustrates an embodiment of a traffic phase.

One embodiment of the structure of the traffic phase is shown in more detail in FIG. 4. As shown, traffic frames k−1 and k+1 (where k is an integer) are normal traffic frames that contain three traffic slots on different frequencies Fh(x) within the hop set (where Fh(x) indicates that the frequency may change for the traffic slots). Traffic frame k is replaced with a late join frame that contains two traffic slots on different hop set frequencies and one late join slot (the third traffic slot is discarded and replaced by the late join slot). The late join slot is the same duration as the traffic slot it replaces.

The late join frame is provided once every j traffic frames, where j is bounded as below. The periodicity of repetition may be constant or may vary depending on a number of factors including impact on audio quality (e.g., using signal-to-noise ratios), impact of frequency diversity, late call join latency, and uniform distribution of bandwidth. Voice quality may be affected if one or none of the remaining traffic slots is not received due to interference (although voice quality may have been compromised to a lesser extent, if at all, if the traffic slot was not used for the late join frame—and frequency used to transmit the late join slot had no interference). Late join latency is affected because the late join latency is directly proportional to the number of late join frame transmissions. Expected group size of the talkgroup to which the originator is transmitting may influence the periodicity as the late join frame may be more frequent as the expected group size increases with the expectation that a greater number of targets may lose the call or may miss some or all of preamble or sync frames in the connection establishment phase.

The periodicity of replacing the traffic frame with the late join frame also loads the frequencies associated with the late join slot more heavily, thereby causing the mapping to frequencies in the hop set to be adjusted in order to compensate to achieve uniform utilization of the spectrum. However, de-emphasis applied by the mapping tables can only compensate non-uniform utilization of the spectrum to limited extent. Thus, a tradeoff exists between the ability to join a call late and the above-mentioned regulatory requirements. The periodicity j may have limitations as, if the late join frames occur too often, the associated frequencies of the late join slots become overused and unable to be compensated for, resulting in non-uniform utilization. The periodicity that satisfies these demands can range between about 10 and 100 traffic frames, but may be any value therebetween so that late join opportunities occur about once every second to about once every 5-10 seconds (or anywhere therebetween). In any event, the PN to frequency mapping tables are properly configured to average out frequency use.

Other values for the late join period can be chosen to adjust the trade-off between diversity and latency. The timing of the late join period within the traffic phase of communication is a system design parameter that is known a priori and thus is present in memory at least before the traffic phase of the call. This parameter may be indicated when the originator/target is programmed (either at the factory or in the field) or may be set during the connection establishment phase for each call. Such an arrangement permits targets already present in the call to ignore/discard the late join slot, so that the late join slot does not result in an error due to the information in the late join slot being different from the information in the traffic slots of the late join frame.

In one embodiment, the replacement may be periodic but have an initial hold-off time that has no relationship to the periodicity of the replacement. In other words, the first late join frame may not occur for a predetermined amount of time and then successive late join frames are provided every j traffic frames. In another embodiment, the replacement may occur a limited number of times during any one call so that, for example, only 2-4 opportunities are present to join. Such limited opportunities may be weighed more heavily towards the beginning of the call (with the mapping being affected correspondingly) with the understanding that it is more desirable to enable a target to join a call at its early stages than later, thereby missing a large initial portion of the call and perhaps critical information. For example, if a call is about 2 minutes long and the period of repetition is once every 5 seconds, a target may only be permitted to join the call within the first 20-30 seconds, perhaps with an initial hold-off of 10 seconds so that only four late join frames are transmitted.

The late join slot may be provided in any of the positions of the traffic slots of a particular late join frame and may be determined, e.g., randomly. For example, in the first late join frame, the late join slot replaces the last traffic slot, as shown in FIGS. 3 and 4, but replaces the first traffic slot of the next late join frame. Alternately, the late join slot may always replace a traffic slot in the same location (e.g., the last traffic slot) in a late join frame.

In the embodiment shown in FIG. 4, the late join slot contains three late join subframes: a subframe preamble, a subframe sync burst, and a subframe PID. In this embodiment, the frequencies selected are similar to that in a normal frame, i.e., the preamble uses one of the same frequencies (Fp) used for preambles during the connection establishment phase while the sync and PID bursts uses one of the same frequencies (Fs) used for sync bursts during the connection establishment phase.

Figure 5:
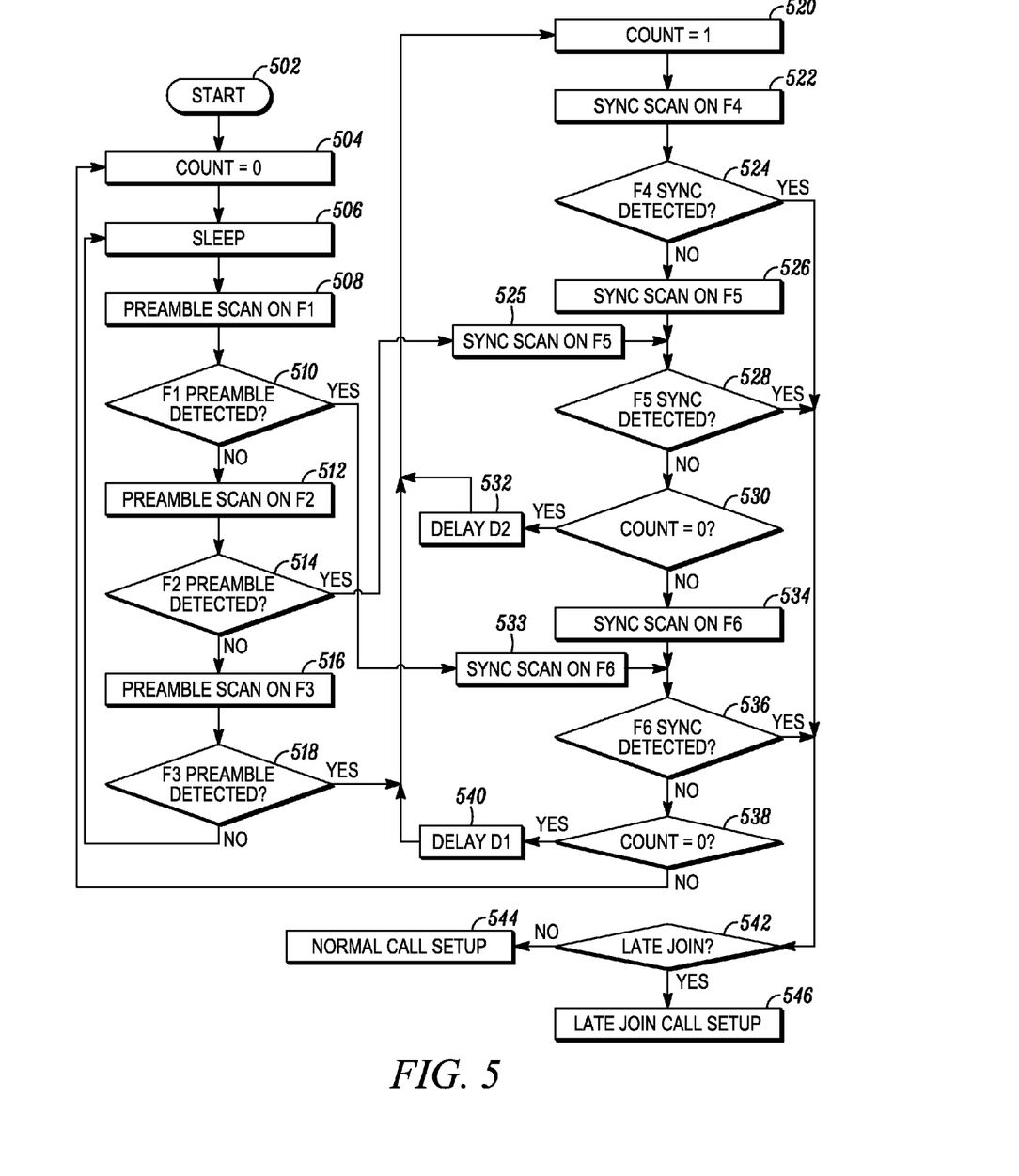
FIG. 5 illustrates an embodiment of a flowchart of the traffic phase of FIG. 4.

In order to ensure that every preamble gets scanned, the preamble scan period is less than a predetermined threshold that is related to the preamble frame (or subframe) duration. The smaller the frame smaller the threshold, i.e. the preambles are scanned more frequently. Since the preamble subframe in a late join frame is much smaller than a preamble frame in a connection establishment phase a target that is not in an on-going call scans the preamble frequencies more frequently to catch the preamble subframe. Unlike the connection establishment phase in which the sync data is transmitted e.g., three times in each of three sync frames on the sync frequencies, in the late join case the sync data is only transmitted once on one sync frequency. Accordingly, the target scan technique may be modified as shown in the flowchart of FIG. 5. A predetermined correspondence between the preamble frequencies and the sync frequencies is used for a target joining a call late. This is a one-to-one correspondence that is used only during late join.

As shown in FIG. 5, the process starts at step 502. An on-going call may or may not be in progress at this point. An internal counter is initialized (as shown in the figure, reset to 0) at step 504 and the target reduces power by sleeping at step 506. The target may, of course, initialize the counter after waking up rather than before entering sleep mode. At the appropriate time, the target wakes up and at step 508 scans for a preamble on the first preamble frequency. The appropriate time is predefined such that the target checks for a call, independent of whether the call is starting or is already in progress. If no preamble is detected on the first preamble frequency at step 510, at step 512 the target scans for a preamble on the second preamble frequency. If no preamble is detected on the second preamble frequency at step 514, at step 516 the target scans for a preamble on the third preamble frequency. If no preamble is detected on the third preamble frequency at step 518, the target returns to step 508, where it enters sleep mode and waits until the next period for sensing for a preamble.

If a preamble is detected on the first preamble frequency at step 510, at step 533 the target scans for a sync pulse at the third sync frequency, which is predefined to have a one-to-one correspondence with the first preamble frequency. If sync pulse is not detected on the third sync frequency at step 536, at step 538 the counter value is checked. At step 538, it is determined whether the counter has been set to 1, indicating that the regular sync scan has begun. If at step 538 the counter has not been set, at step 540 the target sets a delay D1. The delay D1 is 2× the length of preamble frame−(length of the preamble+sync subframes in the late join frame). After the delay D1 has expired, at step 520 the target sets the counter value to 1 and scans for a sync pulse at the first sync frequency at step 522. If a sync pulse is not detected on the first sync frequency at step 524, the target scans for a sync pulse at the second sync frequency at step 526. If a sync pulse is not detected on the second sync frequency at step 528, at step 530 the counter is again checked. If the counter value is 0, at step 532 the target sets a delay D2. The delay D2 is the length of preamble frame−(length of the preamble+sync subframes in the late join frame). After the delay D2 has expired, the target returns to step 520. If at step 530 the counter value is 1, at step 534 the target again scans for a sync pulse at the third sync frequency. If a sync pulse is not detected on the third sync frequency at step 536, at step 538 the counter value is again checked. If the counter is set, the target reverts back to step 504.

If a preamble is not detected on the first preamble frequency at step 510 but a preamble is detected on the second preamble frequency at step 514, at step 525 the target starts by scanning for a sync pulse at the second sync frequency, which as above is predefined to have a one-to-one correspondence with the second preamble frequency. Similarly, if a preamble is not detected on the first preamble frequency at step 510 or the second preamble frequency at step 514 but a preamble is detected on the third preamble frequency at step 518, at step 522 the target starts by scanning for a sync pulse at the first sync frequency, which as above is predefined to have a one-to-one correspondence with the third preamble frequency. Thus, in this embodiment, the order of scanning the sync frequencies depends on the frequency on which the preamble is detected. The sync scan duration for the first and second sync frequencies depend on whether the first or second preamble frequency has been detected (i.e., whether the counter value is 0 or 1). Thus, steps 525 and 526 and steps 533 and 534 are the same, except that the sync scan duration differ. These are shown as different steps in FIG. 6. However, in a different embodiment, an sync scan duration variable is set dependent on the counter value such that if the counter value is 0, the sync scan duration is set to correspond to the sync subframe duration of the late join frame while if the counter value is 1, the sync scan duration is set to correspond to the connection establishment sync frame.

As illustrated in FIG. 5, once a preamble is detected (regardless of which sync pulse is initially scanned for), the target continues to scan through all of the sync frequencies until it either finds a sync pulse on one synch frequency or fails to find a sync pulse on any synch frequency during one iteration. If the target finds a sync pulse at step 522, 526 or 534, at step 544 the target determines whether it is joining a call that is in progress or whether it is joining the beginning of a call. If at step 544 the target determines it is joining the beginning of a call, at step 546 the target begins a normal call setup procedure that results in the target joining the call (e.g., using the next hop frequency to receive the PID from the message header frame). If at step 544 the target determines it is joining a call already in progress, at step 548 the target begins a late join call setup procedure that results in the target joining the call (e.g., using the same sync frequency to receive the PID from the message header subframe). An acknowledgement to the received sync pulse may or may not be sent by the target during this call setup procedure dependent on whether the target is joining at the beginning of the call or a call in progress. If the target fails to find a sync pulse at step 524, 526, or 534 and the count is set to 1, the target returns to step 504 where the counter is reset before waiting for and initiating another attempt to join the call.

During the connection establishment phase, the first sync frequency is scanned only after a predetermined delay. When the third preamble frequency is detected during the connection establishment phase, however the target starts scanning the first sync frequency immediately. Thus, in FIG. 5, the third preamble frequency is paired with the first sync frequency so that the process during late join case matches that of the connection establishment phase. In this case, a bit-field in the sync sub-frame permits distinguishing between a late join sync sub-frame and a sync frame during regular connection establishment. In an alternative embodiment from that shown in FIG. 5, the first preamble frequency may be paired with the second sync frequency and the second preamble frequency may be paired with the third sync frequency.

Although only three preamble and sync frequencies are shown in FIG. 5, any number may be used dependent on the restriction that the late join slot fits into the time period of the traffic slot that it replaces and thus the late join frame fits into the time period of the traffic frame it replaces. Similarly, in the embodiment shown, the maximum number of sync frequencies that the target scans for is the total number of sync frequencies. However, in other embodiments the maximum number of sync frequencies that the target scans for can be larger or smaller than the total number of sync frequencies given that sufficient time exists to lock into the frequencies and scan for a signal. The former case permits rescanning of one or more particular frequencies if desired, while the latter case reduces the time spent scanning for sync pulses. In addition, although FIG. 5 illustrates that the counter is incremented until it reaches a maximum, the counter may be decremented until it reaches a minimum or some other method of reaching a maximum number of attempts is determined before the target resets the counter and waits until the next available late join opportunity.

As is apparent, the method shown in FIG. 5 is used for both normal call setup and late join call setup. During the connection establishment phase, the preamble is transmitted on a particular preamble frequency while the sync data is transmitted on a sync frequency that does not correspond with the particular preamble frequency. Thus, in the embodiment of FIG. 5, the target steps through all of the sync frequencies. In the connection establishment phase, there are multiple opportunities to find and decode the sync pulse as it is transmitted in different sync frames each on a different sync frequency. During the late join case, however, there is only one chance as the sync burst is transmitted in a single subframe on only one frequency. Accordingly, in another embodiment while the target can scan all of the sync frequencies in any order during the connection establishment phase, it is desirable during a late join case that the target use the scan sequence shown in FIG. 5 so that the sync frequency corresponding to the frequency on which the preamble was detected is always checked first.

If the steps in the normal call startup and the late join case are the same, once the preamble is detected, the target hops to the corresponding sync frequency to decode the sync pulse. At this point, the target cannot discern between the connection establishment phase and the late join case. To address this, a particular data field within the sync pulse of the sync subframe may be used to indicate the late join case to the target. More specifically, the sync data field indicates to the target the sync word position in each normal sync frame in the connection establishment phase. This information allows the target to do timing calculations and be ready to receive an acknowledgement. For the sync word in the late join frame, the sync data field is assigned a value that is different from that expected in a normal sync frame. For example, if the three sync frames are present in the connection establishment phase, the target may expect values 0, 1, or 2 for the sync word. For a late join case, the sync word may have a value of 3. The use of an unexpected value alerts the target that it is joining a call in progress, and the target knows not to expect an acknowledgment and not to hop to a frequency in the hop set for a message header frame. Instead, the target remains on the same sync frequency and immediately decodes message header data, including the PID. At this point, the target has sufficient information to join the call on the next traffic slot.

In other embodiments, if the steps in the normal call startup and the late join case are not the same and the target can determine this prior to scanning for the sync frequency, only the sync frequency corresponding to the preamble frequency can be scanned by the target before waiting for the next late join opportunity.

Figure 6:
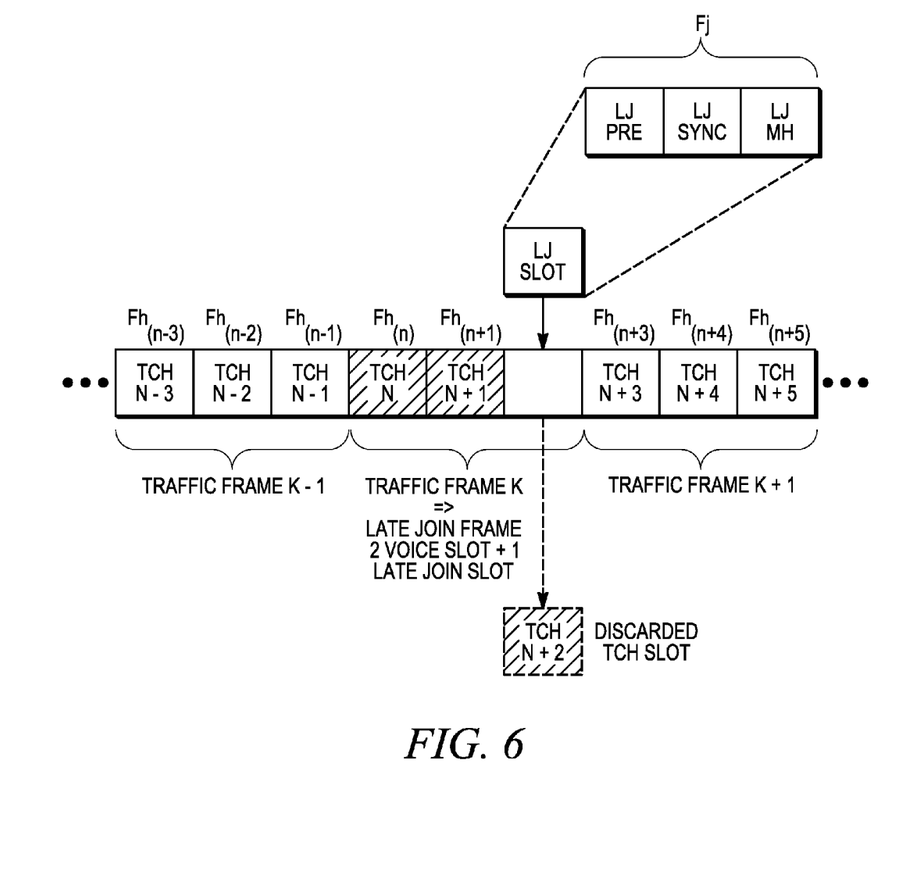
FIG. 6 illustrates an embodiment of a traffic phase.

Another embodiment of the structure of the traffic phase is shown in more detail in FIG. 6. The embodiment shown in FIG. 6 is similar to that shown in FIG. 4 except that the preamble, sync, and message header subframes of the late join slot are provided on the same late join frequency Fj. While the entire late join slot may be transmitted on one of the preamble or sync frequencies, this increases loading on the preamble or sync frequency and may not be able to be compensated for during the call to permit uniform spectrum distribution using the mapping tables. Thus, the late join frequency may be one or more frequencies selected from a set of predetermined frequencies that are not either the preamble or sync frequencies. This avoids further loading the preamble or sync frequencies due to the late join activities. The late join frequency, however, is then de-emphasized in the frequency selection process for the hop set frequencies in a manner similar to de-emphasizing the preamble and sync frequencies in order to create a uniform frequency distribution, although the timing may not be the same. For example, it may take 100 traffic slots before the mapping is adjusted to no longer de-emphasize the preamble and sync frequencies, this number being independent of the call as the same number of preamble and sync frequencies are always used at the start of a call, whereas it may take 150-200 traffic slots before the mapping is adjusted to no longer de-emphasize the preamble and sync subframe frequencies as the number of times the preamble and sync subframe frequencies are used (due to the replacement frames) may be greater than the number of times the preamble and sync frequencies are used.

Note that when the late join slot uses a frequency that is not one of the preamble frequencies, the target scans the preamble frequencies as well as the late join frequency. Since the preamble frequencies are the only allowed frequencies for the connection establishment phase, these frequencies are scanned at the original rate. The late join frequency can be scanned more frequently as the late join frame only transmits a preamble in its first subframe. For example, assuming it takes a target x ms to scan all n preamble frequencies and the target scans the preamble frequencies once every y ms (the rest of the time the target is idle), scanning for the additional late join frequency uses an about additional z ms (z<x/n). Thus, the total scan time is x+z ms to scan the preamble frequencies and any frequency rate of scanning can be used so long as the number of scans k for the late join frequency is such that $k \leq \text{int}(y/(x+z))$.

In this embodiment, the target is able to discern a standard call set-up from a late join set-up based on the frequency on which the preamble was found. If a preamble was detected on the late join frequency, the call is a late join call; whereas if the preamble was found on a preamble frequency, then the call is a normal call set-up during the connection establishment phase. If the late join information may be allocated among one of multiple frequencies, the loading on the late join frequencies is reduced at the expense of increasing the target scan time.

Figure 7:
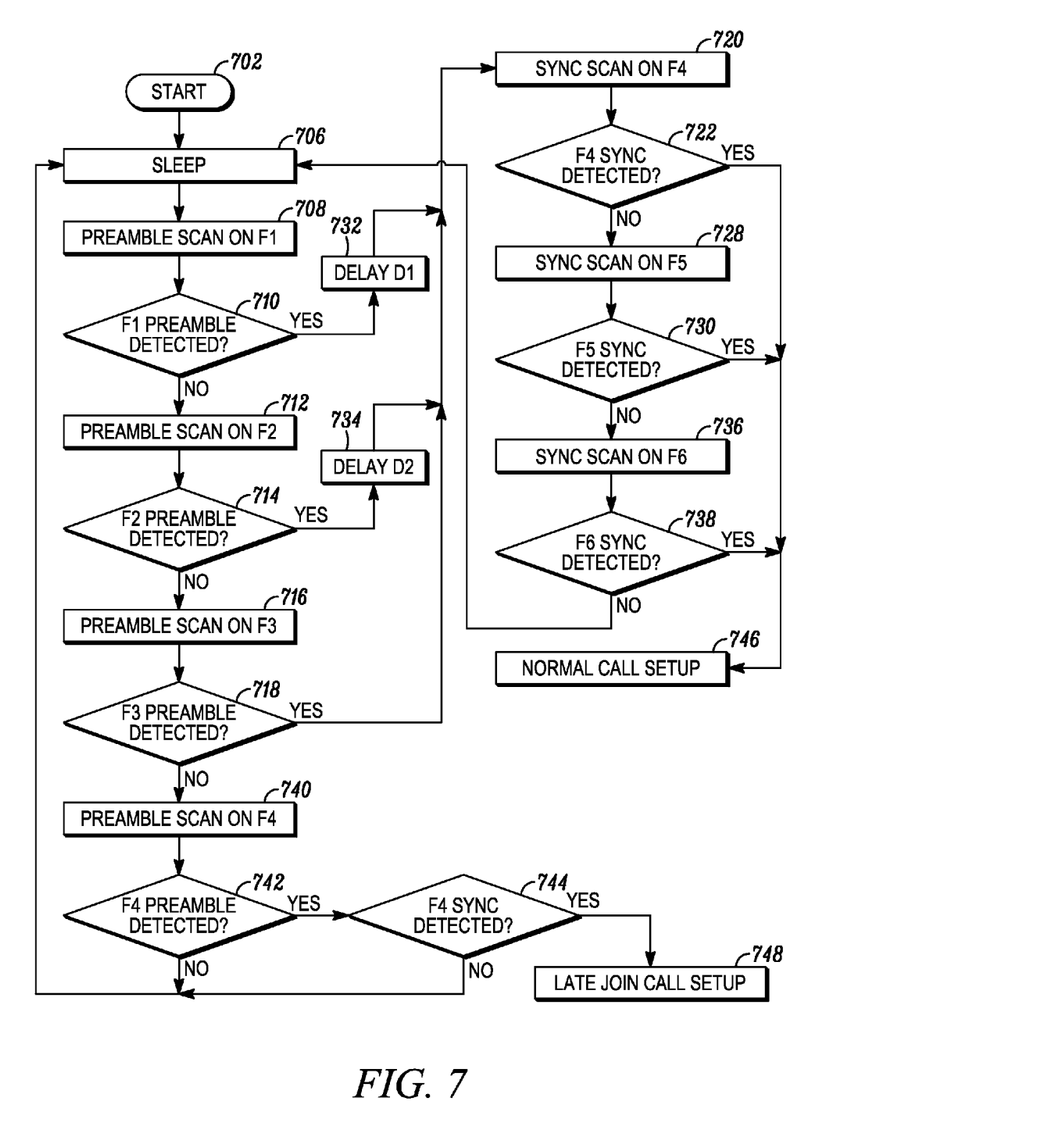
FIG. 7 illustrates an embodiment of a flowchart of the traffic phase of FIG. 6.

A flowchart of the traffic phase of FIG. 6 is shown in FIG. 7, at step 702 the process starts and it is unknown whether a call has not started or an on-going call is in progress. The target reduces power by sleeping at step 706 until the target wakes up and at step 708 scans for a preamble on the first preamble frequency. If no preamble is detected on the first preamble frequency at step 710, at step 712 the target scans for a preamble on the second preamble frequency. If no preamble is detected on the second preamble frequency at step 714, at step 716 the target scans for a preamble on the third preamble frequency. If no preamble is detected on the third preamble frequency at step 718, at step 740 the target scans for a preamble on the fourth (late join) preamble frequency. If no preamble is detected on the fourth preamble frequency at step 742, the target returns to step 708, where it waits until the next late join opportunity.

If a preamble is detected on the first preamble frequency at step 710, the second preamble frequency at step 714, or the third preamble frequency at step 718, at step 720 the target scans for a sync pulse at the first sync frequency. Specifically, if a preamble is detected on the first preamble frequency at step 710, at step 732 the target sets a delay D1, which is twice the length of a preamble frame, while if a preamble is detected on the second preamble frequency at step 714, at step 734 the target sets a delay D2, which is the length of a preamble frame. After the delay D1 or D2 has expired, the target proceeds to step 720. If sync pulse is not detected on the first sync frequency at step 722, at step 728 the target scans for a sync pulse at the second sync frequency. If sync pulse is not detected on the second sync frequency at step 730, at step 736 the target scans for a sync pulse at the third sync frequency. If the target finds a sync pulse at step 722, 730 or 738, at step 746 the target begins a normal call setup procedure that results in the target joining the call (e.g., using the next hop frequency to receive the message header frame). If sync pulse is not detected on the third sync frequency at step 738, the target returns to step 708, where it waits until the next detection period.

If a preamble is detected on the fourth preamble frequency at step 740, at step 742 the target remains on the same frequency for the sync burst or scans another of the set of late join frequencies. If a sync burst is not detected at step 744 the target returns to step 708, where it waits until the next late join opportunity. If at step 744 the target detects a sync burst, at step 748 the target begins a late join call setup procedure that results in the target joining the call (e.g., using the same sync or another late join frequency to receive the PID information on the message header subframe). Note that although only one instance of steps 742 and 744 is shown, one or more of each can be present depending on the number of frequencies in the set of late join frequencies.

Figure 8:
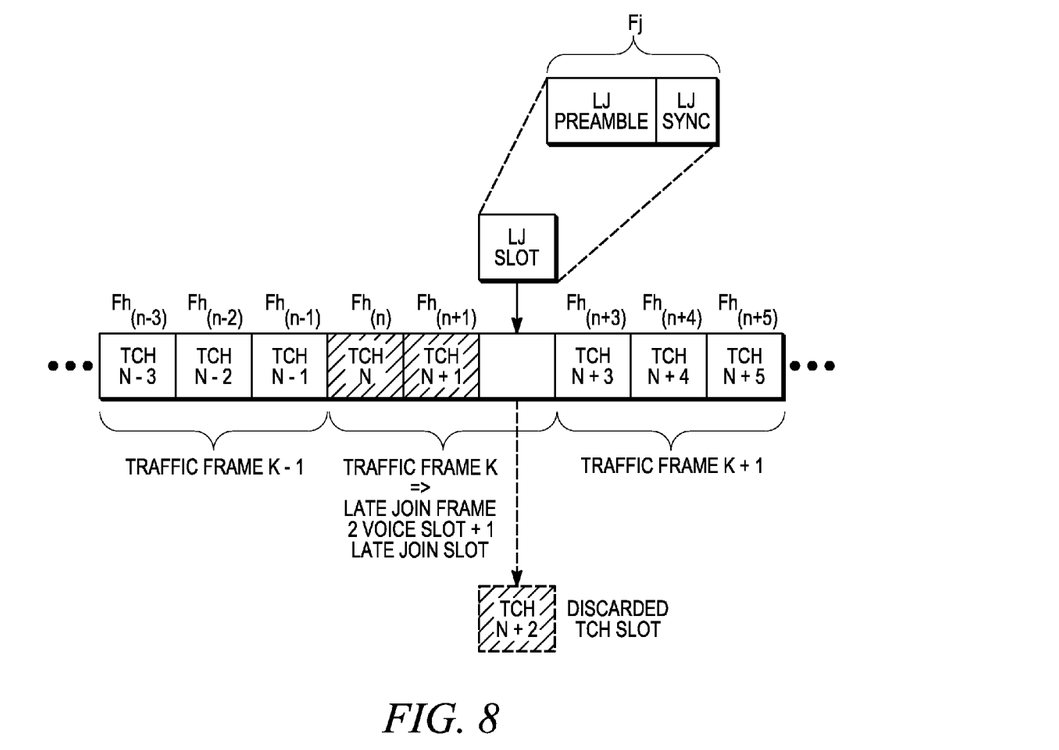
FIG. 8 illustrates an embodiment of a traffic phase.

In the traffic phases shown in FIGS. 4 and 6, the preamble, sync and message header subframes have the same period and are disposed within the period of a single traffic slot. Another embodiment of the traffic phase is shown in FIG. 8. In this embodiment, the message header subframe is eliminated. This results in the PID (among other information) not being transmitted. Thus, in this embodiment when a target enters the call late, the identity of the originator remains unknown. One of the effects of reducing the number of subframes is that this embodiment permits the scan rate of the late frame frequency to be decreased, thereby reducing target processing and increasing battery life. As shown, the preamble subframe is also extended to double its size, taking the first two subframes of the late join frame for the preamble and leaving the last subframe for the sync burst.

In the above embodiments, the frequencies of the subframes in the late join frame are all predetermined However, other embodiments may employ a scheme similar to the normal call start sequence, i.e., the subframes may be spread among the frequencies of the hop set in a similar manner as the traffic slots in the connection establishment phase. While this decreases the usage among the predetermined late join frame frequencies of FIGS. 4, 6 and 8, thereby reducing the amount of de-emphasis to be applied using the PN to frequency mapping, it commensurately increases the target scan time and decreases battery life. In a blended embodiment, the preamble and sync subframes may use one or more predetermined late join frequencies while the message header subframe may use the next frequencies of the hop set (excluding the frequencies used for the preamble and sync bursts).

In a further embodiment, after the target joins an on-going call during a late join case, it initially mutes the call and then emits a late join tone just prior to unmuting the call. This alerts the user of the target that the call being joined is already in progress and that some message contents may have been missed. The user may thus be able to avoid potential problems such as if the target joins an on-going call through the late join procedure above and receives an audio instruction to "use the north entrance," rather than the full message "do not use the north entrance." Without the late join tone, the user may be unable to discern between a standard call receive and a late join call receive. In certain circumstances, such as that in FIG. 8, the user may be alerted to the late call case due to the lack of originator identity being displayed. This, however, may not be sufficient as a user may not be able to look at a display for every received call. In a dark environment or active activity, such action may be impossible or even dangerous, especially if a user is an emergency responder or actively involved in emergency response at an emergency response location. The late join tone provides an effective indication by generating a unique alert upon successful receipt of a late join frame. Similarly, a unique vibration may be used in addition, or as a substitute, to the late join tone.

Although generally traffic frames containing audio information have been described, similar techniques can be used for other types of data frames—such as frames carrying video data. In addition, although the ISM band has been mentioned with particularity, the various embodiments may be used in other bands.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments may be implemented as a combination of both software (e.g., a computer program product) and hardware. Still other embodiments are implemented as entirely hardware, or entirely software (e.g., a computer program product).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

The invention claimed is:

1. A method of enabling late entry into an on-going call, the method comprising a target receiving, in place of a traffic frame of a spread spectrum direct mode call, a late join frame, the traffic frame having a plurality of traffic slots, one of the traffic slots in the traffic frame being replaced by a late join slot of the same size as the one of the traffic slots to form the late join frame, the late join slot having sufficient information to permit a target not in the call to join the call, the traffic slots in the traffic frame replicating data contained therein such that call quality of the call is substantially unaffected if one of the traffic slots is not received.

2. The method of claim 1, further comprising the target discarding the late join slot if already on the call.

3. The method of claim 1, further comprising receiving a plurality of late join frames, the late join frames having a predetermined periodicity such that the late join frames are separated by a predetermined number of traffic frames.

4. The method of claim 3, wherein receiving the late join frames comprises receiving a first late join frame after an initial hold-off time that has no relationship to the periodicity of the late join frames.

5. The method of claim 3, wherein the late join frames during the call are limited to a predetermined number that is fewer than would be present during the call if not limited.

6. The method of claim 1, wherein the sufficient information includes a preamble and sync burst in separate subframes of the late join slot.

7. The method of claim 6, wherein the sufficient information further includes a message header subframe having a private identification of an originator that transmits the late join frame, the message header subframe separate from the preamble and sync subframes.

8. The method of claim 6, wherein the subframes are received on at least one predetermined frequency while the traffic frame replaced by the late join frame would have been received on a non-predetermined frequency.

9. The method of claim 8, wherein use of the at least one predetermined frequency is compensated for when non-predetermined frequencies on which to transmit traffic frames in the call are selected to obtain uniform utilization of a frequency spectrum during the call, the non-predetermined frequencies including the at least one predetermined frequency.

10. The method of claim 9, wherein the non-predetermined frequencies are selected using mapping between a pseudo-random number sequence and frequency, and use of the at least one predetermined frequency is compensated for by de-emphasizing the at least one predetermined frequency during the mapping.

11. The method of claim 10, wherein a periodicity of late join frames in the call is limited to limit an amount of de-emphasis to be supplied by the mapping.

12. The method of claim 10, wherein the mapping is adjusted to no longer de-emphasize the at least one predetermined frequency when the call reaches a preset number of traffic frames in which the use of the at least one predetermined frequency has already been compensated for previously by the call.

13. The method of claim 6, wherein the preamble and sync subframes are received on one of the same preamble and sync frequencies, respectively, on which preamble and sync frames are transmitted during a connection establishment phase of the call.

14. The method of claim 13, wherein the sufficient information further includes message header subframe separate from the preamble and sync subframes, the message header subframe transmitted on the same sync frequency on which the sync subframe is transmitted.

15. The method of claim 13, wherein the preamble and sync subframes are transmitted only once during the late join slot.

16. The method of claim 13, wherein there exists a one-to-one correspondence between the frequencies on which the preamble subframe is able to be transmitted and the frequencies on which the sync subframe is able to be transmitted such that when the preamble subframe is transmitted on a particular preamble frequency, the sync subframe is transmitted on the corresponding sync frequency.

17. The method of claim 16, further comprising after receiving the preamble subframe scanning the corresponding sync frequency before scanning additional sync frequencies.

18. The method of claim 17, further comprising scanning all sync frequencies once before waiting for a next late join frame if failing to detect a sync burst on any of the sync frequencies.

19. The method of claim 13, further comprising:
determining that the call is not in progress by determining that a sync word within the sync subframe has value found in a sync frame, and beginning a normal call setup procedure used by the target at a beginning of the call and that results in the target joining the call; and
determining that the call is in progress by determining that the sync word has a late join value different from any value possibly found in the sync frame, and beginning a late join call setup procedure that results in the target joining the call, the late join call setup procedure different from different from the normal call setup procedure.

20. The method of claim 6, wherein the preamble and sync subframes are received on at least one of one or more predetermined late join frequencies while preamble and sync frames used during a connection establishment phase of the call are received on a plurality of predetermined preamble and sync frequencies, respectively, the one or more predetermined late join frequencies different from the preamble and sync frequencies.

21. The method of claim 20, wherein the at least one of one or more predetermined late join frequencies and the plurality of predetermined preamble and sync frequencies are compensated for when non-predetermined frequencies on which traffic frames in the call are received are selected to obtain uniform utilization of a frequency spectrum during the call, the non-predetermined frequencies including the at least one of one or more predetermined late join frequencies and the plurality of predetermined preamble and sync frequencies.

22. The method of claim 21, wherein the non-predetermined frequencies are selected using mapping between a pseudo-random number sequence and frequency, and use of the at least one of one or more predetermined late join frequencies and the plurality of predetermined preamble and sync frequencies are compensated for by de-emphasizing the at least one of one or more predetermined late join frequencies and the plurality of predetermined preamble and sync frequencies during the mapping.

23. The method of claim 22, wherein the mapping is adjusted to no longer de-emphasize the plurality of predetermined preamble and sync frequencies when the call reaches a first preset number of traffic frames in which the use of the plurality of predetermined preamble and sync frequencies has already been compensated for previously by the call.

24. The method of claim 23, wherein the mapping is adjusted to no longer de-emphasize the at least one of one or more predetermined late join frequencies when the call reaches a second preset number of traffic frames in which the use of the at least one of one or more predetermined late join frequencies has already been compensated for previously by the call, the first and second preset numbers able to be different.

25. The method of claim 20, further comprising determining a standard call set-up from a late join call set-up based on the frequency on which the preamble is received.

26. The method of claim 20, wherein the preamble and sync subframes have the same duration.

27. The method of claim 20, wherein the preamble and sync subframes are the only subframes in the late join slot.

28. The method of claim 27, wherein the preamble subframe is twice as long as the sync subframe.

29. The method of claim 1, wherein after the target joins the call due to receiving the late join frame, the target emits a predetermined tone prior to unmuting the call to indicate that the call being joined is already in progress.

* * * * *

UNITED STATES PATENT AND TRADEMARK OFFICE
CERTIFICATE OF CORRECTION

PATENT NO. : 8,295,825 B2  
APPLICATION NO. : 12/957190  
DATED : October 23, 2012  
INVENTOR(S) : Pinder et al.

Page 1 of 1

It is certified that error appears in the above-identified patent and that said Letters Patent is hereby corrected as shown below:

In Column 13, Line 4, delete "predetermined" and insert -- predetermined. --, therefor.

In Column 16, Lines 19-20, in Claim 19, delete "different from different from" and insert -- different from --, therefor.

Signed and Sealed this
Fifth Day of February, 2013

Teresa Stanek Rea
*Acting Director of the United States Patent and Trademark Office*